United States Patent [19]

Date et al.

[11] Patent Number: 5,035,058

[45] Date of Patent: Jul. 30, 1991

[54] CHAIN SAW GUIDE BAR

[75] Inventors: Yozo Date; Toshihiro Tsumura, both of Miki, Japan

[73] Assignee: Suehiro Seiko Kabushiki Kaisha, Miki, Japan

[21] Appl. No.: 549,619

[22] Filed: Jul. 9, 1990

[51] Int. Cl.[5] .................... B27B 17/02; B23D 57/02

[52] U.S. Cl. .................... 30/387; 30/383

[58] Field of Search .................... 30/381, 383, 387, 515, 30/388; 474/155, 156, 157

[56] References Cited

U.S. PATENT DOCUMENTS

| | | | |
|---|---|---|---|
| 2,913,020 | 11/1959 | Nielsen | 30/387 |
| 3,949,475 | 4/1976 | Tokarz | 30/387 |
| 4,361,960 | 12/1982 | Halversen | 30/387 |
| 4,393,590 | 7/1983 | Pantzar | 30/387 |
| 4,693,005 | 9/1987 | Wehle et al. | 30/383 |
| 4,825,553 | 5/1989 | Bruccheri | 30/387 |
| 4,837,934 | 6/1989 | Krohn | 30/387 |
| 4,885,843 | 12/1989 | Kelsay et al. | 30/387 |
| 4,903,410 | 2/1990 | Weininger et al. | 30/387 |

*Primary Examiner*—Douglas D. Watts
*Assistant Examiner*—Paul M. Heyrana, Sr.
*Attorney, Agent, or Firm*—Marshall, O'Toole, Gerstein, Murray & Bicknell

[57] ABSTRACT

A guide bar for a chain saw, the bar having oppositely located flat sides. A plurality of recesses are formed in each of the sides, the recesses on one side being offset from the recesses on the other side. At least some of the recesses are filled with a lightweight material. Some of the recesses may also function as oil reservoirs and oil passages between the guide grooves of the bar.

9 Claims, 4 Drawing Sheets

CHAIN SAW GUIDE BAR

FIELD AND BACKGROUND OF THE INVENTION

The present invention relates to an improved chain saw guide bar. The bar of a conventional chain saw has a weight which is a fairly large proportion of the total weight of the chain saw, and it is cantilevered from the engine housing. Japanese Utility Model Early Publication S.63-188101 laid open on Dec. 2, 1988 shows a guide bar formed with relatively large holes therethrough, in which synthetic resin or other lightweight material is embedded, to reduce the bar weight. However, the large holes through the bar weaken it, and the embedded material is exposed on both sides and may therefore be released from the bar after long use.

SUMMARY OF THE INVENTION

It is a general object of this invention to provide a chain saw guide bar which has its weight reduced by removing a relatively large portion thereof, with relatively little loss in strength and life of the bar.

A chain saw guide bar according to the invention has recesses formed alternately in both of its side surfaces.

BRIEF DESCRIPTION OF THE DRAWINGS

Preferred embodiments of the invention are shown in the accompanying drawings, wherein.

DETAILED DESCRIPTION OF THE DRAWINGS

Figure 1:
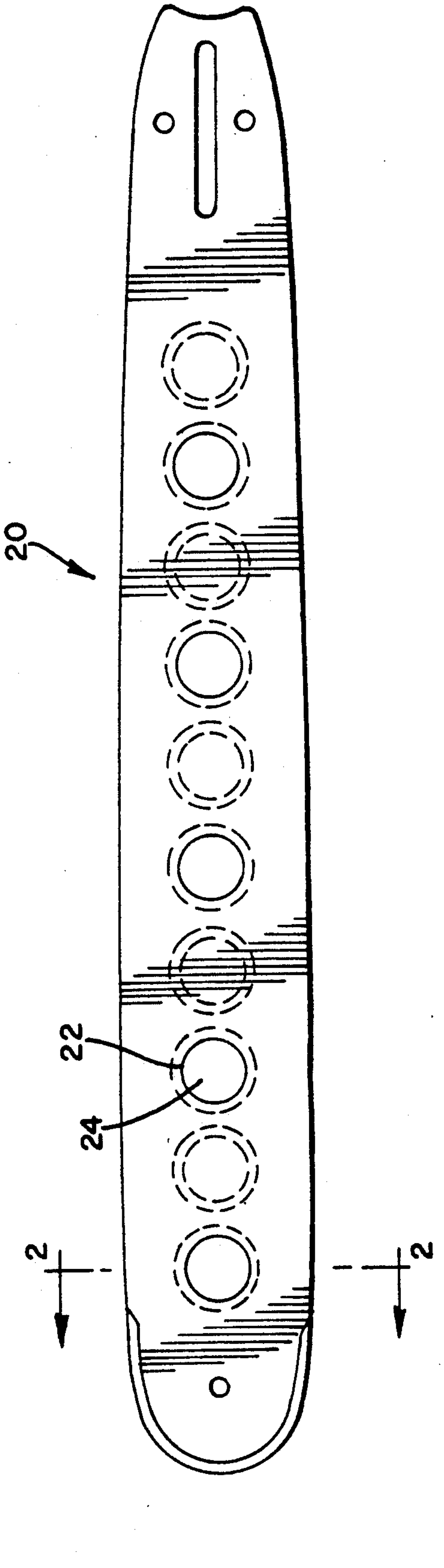
FIG. 1 is a side view of a guide bar according to the invention.
Figure 2:
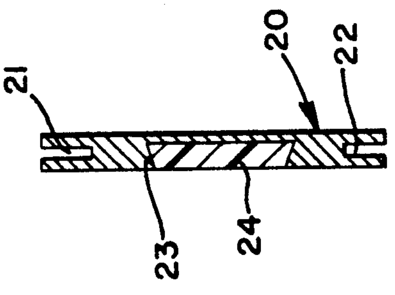
FIG. 2 is an enlarged cross-sectional view taken along line 2—2 of FIG. 1.

With reference to FIGS. 1-2, a guide bar 20 is made of a single steel plate and is formed, by machining, with upper and lower peripheral grooves 21 and 22 (FIG. 2) for a saw chain. The bar 20 is formed with a plurality of conical recesses 23 in a row along the longitudinal center line of the bar and alternately in both side surfaces. Each recess 23 has a wider bottom area, thus forming a "dovetail" shape.

Each recess 23 is filled with a relatively lightweight filler 24 which also has a conical shape and an outer surface which is flush with the bar surface. The filler 24 may be made of synthetic resin, which is similar to the bar 20 in terms of resistance to wear and heat. The filler 24 may be poured in liquid form into the recesses, and it solidifies after filling recesses 23, or it may be preformed in the shape of the recesses and press-fit into them. With reference to FIG. 2, the filler 24 cannot fall out of the recess toward the right because the recess does not extend fully through the bar, nor toward the left because of the dovetail shape.

Figure 3:
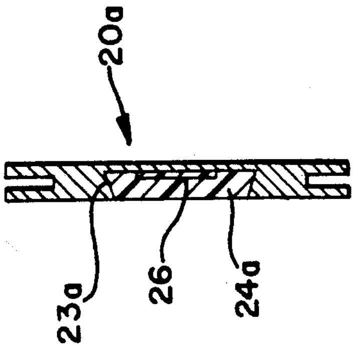
FIG. 3 is a view similar to FIG. 2, but showing an alternative embodiment.

In the embodiment of FIG. 3, the bar 20*a* has the same construction as the bar 20 of FIGS. 1 and 2. However, the filler 24*a* is made of a transparent material. To the bottom of recess 23*a* is attached a sheet 26 coated with a thermometric pigment, which changes in color with the temperature of bar 20*a*. This allows the user to know whether the bar 20*a* is overheated for lack of lubricant or other reasons, in order to prevent the bar from being damaged and the cutting efficiency from lowering.

Instead of the pigmented sheet 26, a thermometric pigment may be mixed with the filler 24*a* in the recesses.

Figure 4:
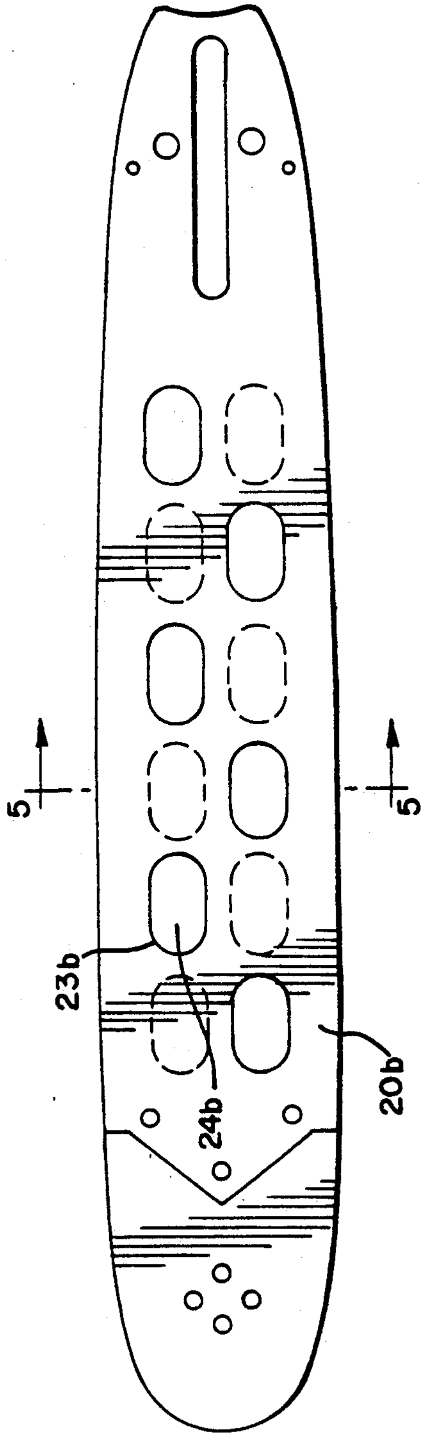
FIG. 4 is a side view of another embodiment of a guide bar according to the invention.
Figure 5:
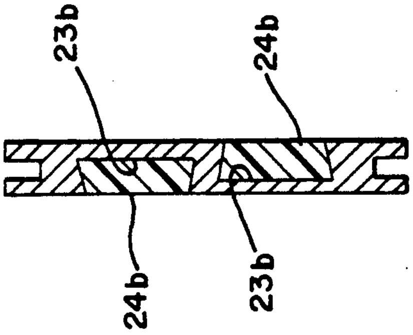
FIG. 5 is an enlarged cross-sectional view taken along line 5—5 of FIG. 4.

In the embodiment of FIGS. 4-5, a guide bar 20*b* is formed with two longitudinal rows of oval recesses 23*b* in each of its side surfaces. The recesses again have a dovetail shape and are filled with a synthetic resin 24*b*. As illustrated, the recesses 23*b* of each row are displaced alternately from those of the other row in each side surface of the bar, and from those of the opposite row in the other surface. This arrangement further reduces the bar weight without lowering its strength.

Figure 6:
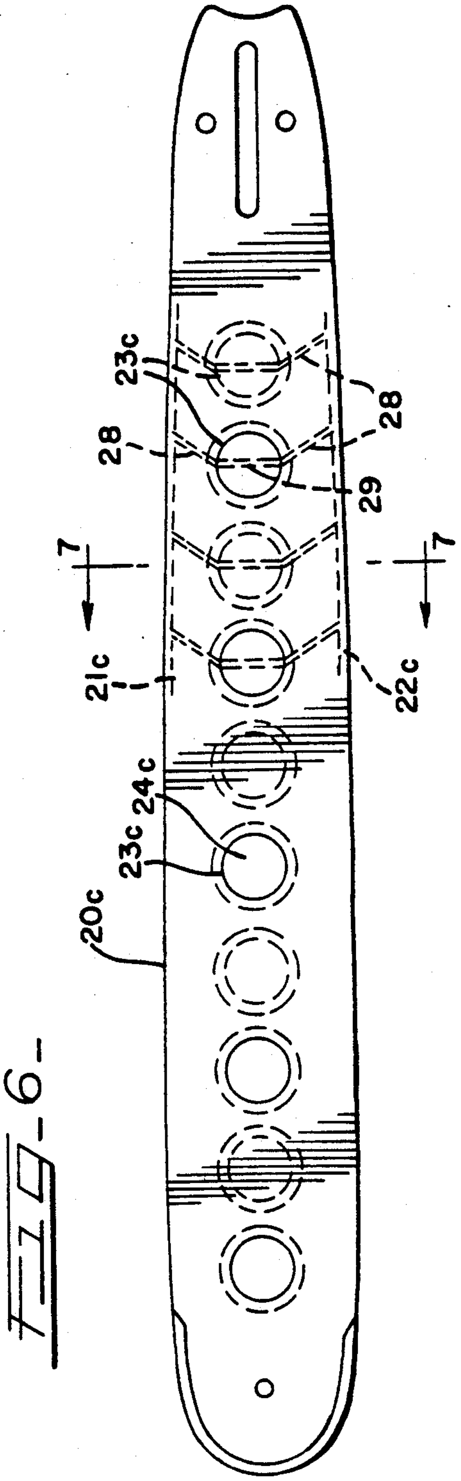
FIG. 6 is a side view of another embodiment of a guide bar according to the invention.
Figure 7:
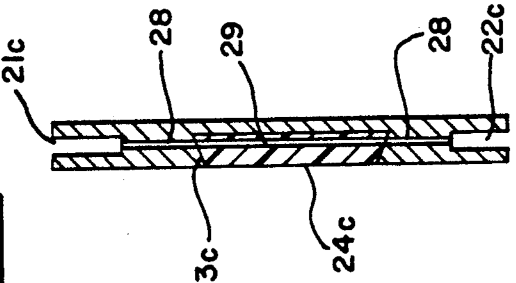
FIG. 7 is an enlarged cross-sectional view taken along line 7—7 of FIG. 6.

In the embodiment of FIGS. 6-7, a guide bar 20*c* has peripheral grooves 21*c* and 22*c* and conical side recesses 23*c*, which are substantially the same as those in FIGS. 1 and 2. Each recess 23*c* is filled with a filler 24*c* of synthetic resin. At least one lubricant bypass 28 extends through the bar 20*c* between each groove 21*c*, 22*c* and the recess 23*c*. The upper and lower portions of the bypasses 28 are interconnected by a bypass portion 29 formed through the filler 24*c*. The upper bypass portion 28 inclines forwardly and downwardly to facilitate the lubricant oil flow into it. In this embodiment, the bypasses are formed through only a portion of the recesses which are closest to the mounting end.

The existence of the recesses 23*c* facilitates the formation of bypasses 28 through the thin bar 20*c*. The bypasses 28 and 29 allow a substantial portion of the oil supplied to the upper groove 21*c* to reach the lower groove 22*c* without being splashed centrifugally around the forward end of bar 20*c*. Most of the cutting occurs at the lower edge of the bar, and this is where most of the oil is needed.

The resin filler 24*c* may contain short fibers of copper or other metal, which improve the chain lubrication and quickly release the friction heat.

Figure 8:
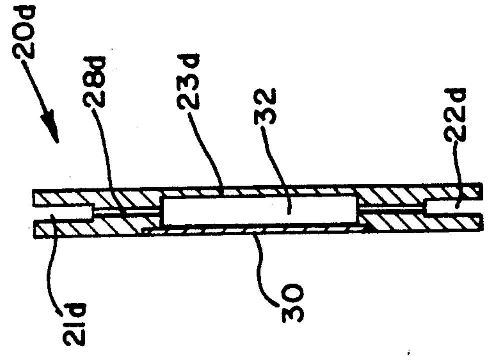
FIG. 8 is a view similar to FIG. 7, but showing still another embodiment.

In the embodiment of FIG. 8, a guide bar 20*d* has cylindrical side recesses 23*d* communicating with peripheral grooves 21*d* and 22*d* through oil bypasses 28*d*. The open side of each recess 22*d* is closed or covered by an aluminium disc 30 which is flush with the bar surface, to form an enclosed cavity 32. The cavity forms a reservoir which temporarily stores oil to adjust the amount of oil flowing into the lower groove 22*d*. Such a cavity may instead be formed in the filler 24*c* in FIGS. 6-7.

Figure 9A:
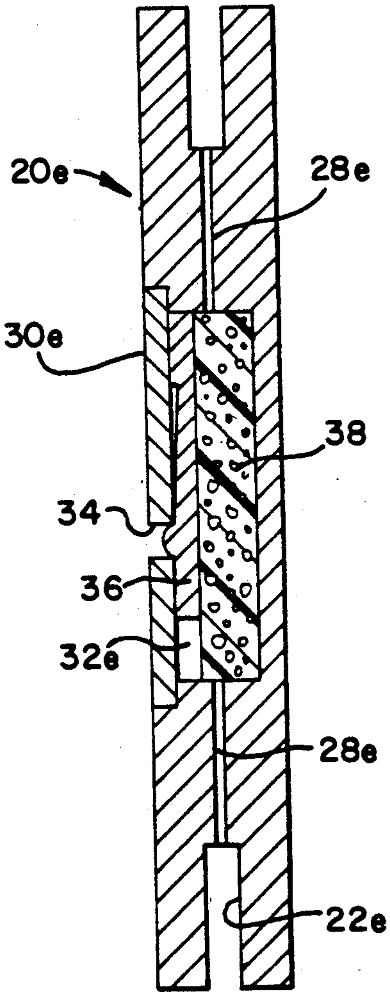
FIGS. 9 and 9*b* are views similar to FIG. 8, but showing still another embodiment in different conditions.
Figure 9B:
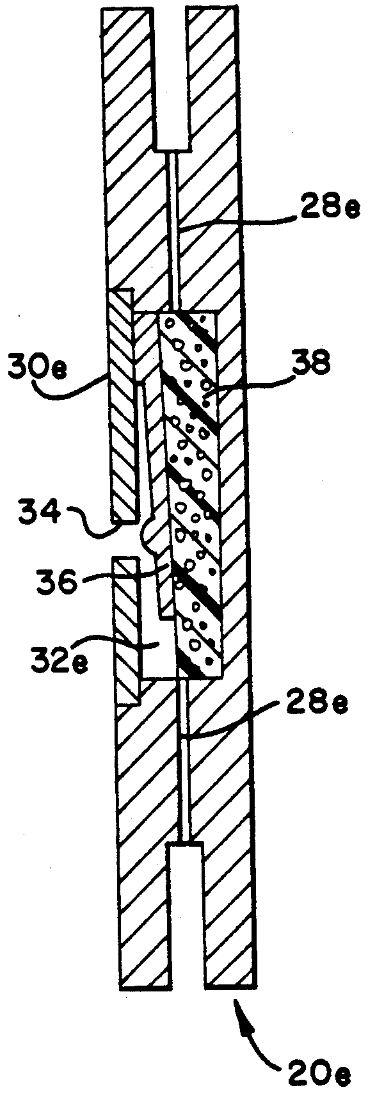

In the embodiment of FIGS. 9*a* and 9*b*, a guide bar 20*e* has similar cavities 32*e* communicating with oil bypasses 28*e* and each closed by a disc 30*e*, which has a small hole 34 formed through it. A closing plate 36 of shape memory alloy is fixed at its upper portion to the back side of the disc 30*e*.

At ambient temperatures, the plate 36 is in its normal position shown in FIG. 9*b*. When the chain saw is in use and the guide bar 20*e* becomes heated to a predetermined temperature (for example, about 45 degrees C.), the plate 36 bends outwardly and tightly closes the hole 34, as shown in FIG. 9*a*, to keep dust and other foreign matter from entering the cavity 32*e*.

The cavity 32*e* is filled with sponge, foamed metal or other porous material 38. This material can be supplied and impregnated with chain oil either from the outlet of an oil feeder (not shown) inserted into the hole 34 and forced against the plate 36 (when in the position of FIG. 9*b*), or by capillary action by dipping the bar 20*e* into the oil. The porous material 38 functions to adjust the amount of oil flowing to the lower groove 22*e* to a steady amount. The guide bar may have one cavity 32*e* or a plurality of such cavities located as shown in FIG. 6, for example.

In a specific example of a guide bar constructed in accordance with the invention, the filler 24 comprises an epoxy resin. The thermometric pigment in the embodiment of FIG. 3 is a cholesteric liquid crystal, and the sheet 26 is a polyester film. The closing plate 36 is a shape memory Ni Ti alloy.

What is claimed is:

1. Apparatus comprising a chain saw guide bar having oppositely located first and second flat side surfaces, a plurality of recesses formed alternately in said first and second flat side surfaces, each of said recesses extending from one of said side surfaces and partially through said bar, and a lightweight material in said recesses and having outer surfaces which are substantially flush with said side surfaces, said lightweight material having a lighter weight than said bar.

2. Apparatus according to claim 1, wherein said lightweight material is transparent, said bar further comprising a thermometric pigment located on the bottom of at least one of said recesses.

3. Apparatus according to claim 1, wherein said lightweight material is mixed with thermometric pigment.

4. Apparatus according to claim 1, wherein said recesses in each of said side surfaces are arranged in at least two rows extending longitudinally of said bar, said recesses in each row in each side surface being displaced alternately from said recesses in the other row, and said recesses in said first side surface being displaced from those in said second side surface.

5. Apparatus according to claim 1, wherein said guide bar is further formed with two peripheral grooves for receiving a chain, and with an oil passage extending through said bar between at least one of said recesses and each of said grooves.

6. Apparatus according to claim 5, wherein said one of the recesses is filled with a lightweight material formed with an oil passage therethrough in alignment with said passage.

7. Apparatus according to claim 1, wherein said recesses have a dovetail shape.

8. Apparatus comprising a chain saw guide bar having oppositely located first and second flat sides, a plurality of recesses formed alternately in said first and second flat sides, said guide bar being further formed with two peripheral grooves for receiving a chain, an oil passage extending through said bar between at least one of said recesses and each of said grooves, said cover plate having an oil hole formed therethrough, said bar further comprising a closing plate of shape memory alloy fixed at one end to the inner surface of said cover plate, said closing plate being bendable outwardly to close said oil hole at predetermined temperatures, and a porous material filling said one of the recesses.

9. Apparatus comprising a chain saw guide bar having oppositely located first and second flat side surfaces, a plurality of recesses formed alternately in said first and second flat side surfaces, each of said recesses extending from one of said side surfaces and partially through said bar, two peripheral grooves for receiving a chain, an oil passage extending through said bar between at least one of said recesses and each of said grooves, and a cover plate closing said one of the recesses, said cover plate being substantially flush with said side surface.

* * * * *